Nov. 4, 1952 H. A. REEB 2,616,210
ANIMAL TRAP
Filed March 26, 1951
2 SHEETS—SHEET 2
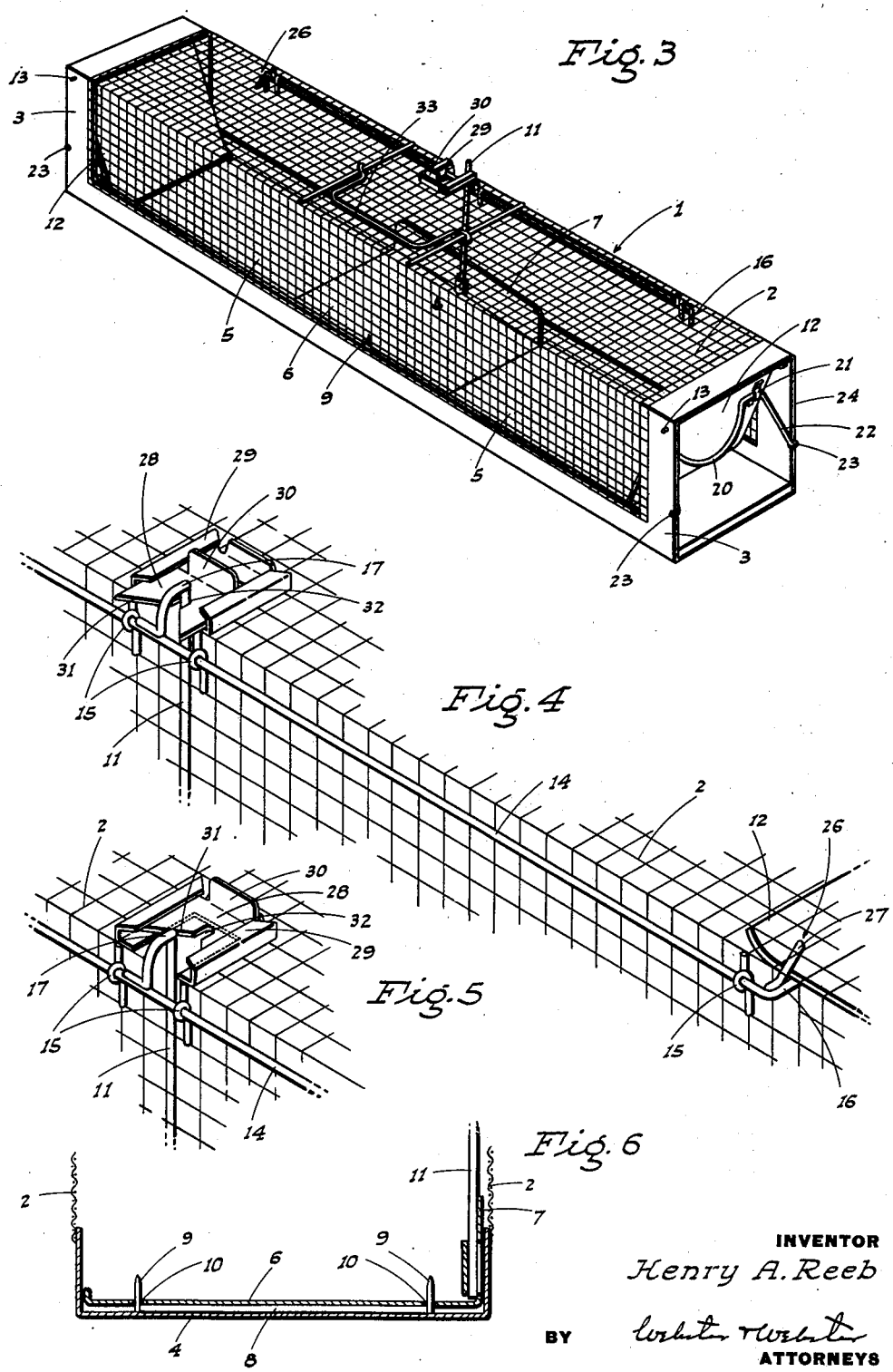
INVENTOR
Henry A. Reeb
BY
ATTORNEYS Patented Nov. 4, 1952

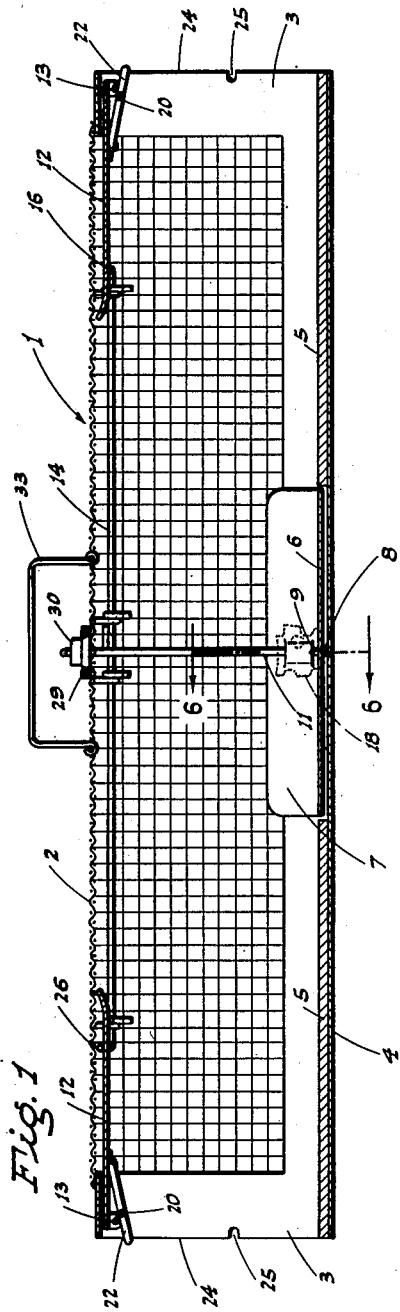
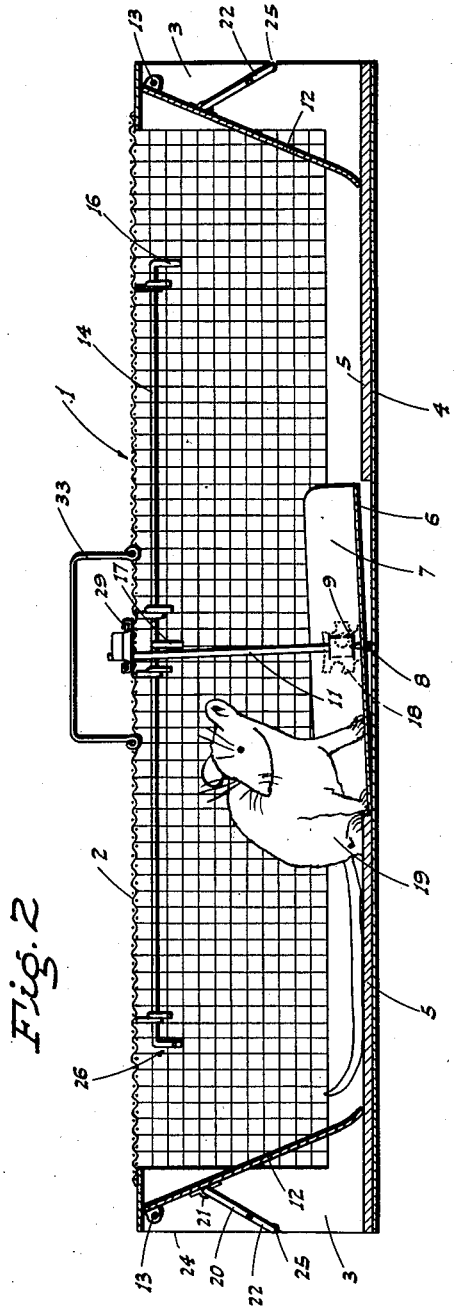

2,616,210

UNITED STATES PATENT OFFICE 2,616,210

ANIMAL TRAP

Henry A. Reeb, Dixon, Calif.

Application March 26, 1951, Serial No. 217,471

5 Claims. (Cl. 43—61)

This invention relates in general to a trap, for catching alive, animals such as rats and other rodents; the trap being an improvement over the type shown in my United States Letters Patent No. 2,499,682, dated March 7, 1950.

A major object of this invention is to provide an animal trap which embodies normally open drop-gates at opposite ends of an initially open-ended cage, and an improved trip mechanism to release the gate supporting catches upon entry of a rodent into the trap and onto a trip platform which said mechanism includes in the cage.

An additional important object of the invention is to provide an animal trap which includes a trip mechanism which is easy to set when the trap is being prepared for use.

Another object of the invention is to provide the drop-gates each with an effective latch which secures the corresponding gate, when dropped, against opening by the trapped animal.

A further object of the invention is to provide an animal trap which is of simplified structure, and includes a minimum of working parts; the trap thus being capable of ready and economical manufacture.

A still further object of the invention is to provide an animal trap which is sturdy, but light weight and thus easily manually portable.

Still another object of the invention is to provide a practical and reliable animal trap, and one which will be exceedingly effective for the purpose for which it is designed.

These objects are accomplished by means of such structure and relative arrangement of parts as will fully appear by a perusal of the following specification and claims.

In the drawings:

Fig. 1 is a longitudinal sectional elevation of the improved animal trap as set for use.

Fig. 2 is a similar view, but shows the trap as sprung, with the gates dropped and locked.

Fig. 3 is a perspective view of the trap, as in Fig. 2.

Fig. 4 is an enlarged fragmentary perspective view showing the trip mechanism engaged and with the trip rod locating slide in use.

Fig. 5 is a similar view, but shows such slide as retracted, whereby to permit the trip mechanism to operate when the trap is sprung by an animal.

Fig. 6 is a fragmentary transverse section on line 6—6 of Fig. 1.

Referring now more particularly to the characters of reference on the drawings, the improved animal trap comprises an elongated cage, indicated generally at 1, which cage is in the main formed of wire mesh 2; the cage being rectangular in cross section and including a rectangular border frame 3 at each end. Additionally, the cage includes a metal bottom 4, and a floor 5 therein; such floor having a break in the central portion thereof for the reception, in normally flush relation, of a teeter platform 6 having upstanding end flanges 7.

The teeter platform 6 rests, centrally of its ends, on a transverse fulcrum bar 8 affixed to the floor 5, but having a pair of upstanding metallic pins 9 which project in loose-play relation through holes 10 in the teeter platform 6. As so mounted, the teeter platform is capable of limited teetering motion about a central transverse axis. Also, such platform can be detached from the pins and removed from the cage for cleaning.

A trip rod 11 is fixed to the teeter platform 6 immediately adjacent one of the end flanges 7, and upstands from such platform centrally of its ends; the trip rod 11 projecting to a termination a short distance above the top of the cage 1, which top is cut away sufficiently to permit of limited swinging motion of such rod lengthwise of said cage.

A drop gate 12 is disposed in each end portion of the cage 1, and each gate is pivoted, at the top, as at 13, to the corresponding border frame 3 for swinging motion between an upwardly and inwardly raised position immediately adjacent and parallel to the top of the cage 1 (see Fig. 1), and a dropped, closed position extending at a downward and inward incline to the floor 5 (see Fig. 2).

A longitudinal rod 14 is turnably mounted and extends along the side of the cage 1 adjacent the trip rod 11; such rod 14 being carried in eyes 15.

At each end the longitudinal rod 14 is formed with an inturned, gate supporting catch finger 16; said fingers normally engaging beneath the corresponding gates 12, holding the same against dropping to closed position.

The longitudinal rod 14 is normally prevented from turning in a direction which will permit the catch fingers 16 to lower, in the following manner:

A trigger finger 17 is fixed on the rod 14 and projects laterally inwardly in the transverse vertical plane which the trip rod 11 occupies when the teeter platform is level or horizontal; such trigger finger resting in quick-releasable relation on the upper end of said trip rod 11 (see Fig. 5).

This is the set position of the trap with the drop gates 12 open, and with the teeter platform 6 level.

A piece of bait is disposed on the teeter platform 6, and an animal 19, attracted into the trap from either end by the bait, steps upon the teeter platform 6, causing it to rotate slightly in one direction or the other about its transverse axis.

When this occurs the trip rod 11 shifts, lengthwise of the trap, out of perpendicular, escaping from beneath the trigger finger 17. The moment that the trigger finger 17 is released the weight of the drop gates 12 swings the catch fingers 16 downward, and such gates escape the fingers and drop to closed position, effectively trapping the animal.

When the drop gates 12 assume such closed position, they are effectively locked against opening from the inside of the cage by the animal, and this is accomplished as follows:

Each drop gate 12 is fitted, on the outside, with a transversely extending, normally depending bail 20 pivoted or turnably attached at the ends, as at 21, to such gate. Locking arms 22 project longitudinally outwardly from opposite ends of the bail 20, and at their free ends such locking arms are formed with laterally projecting catches 23 which ride the adjacent edges 24 of the corresponding sides of the border frame 3.

When each drop gate 12 is in its open position, as in Fig. 1, the locking arms 22 are raised quite high so that they do not obstruct the adjacent open end of the cage. However, when each drop gate 12 is closed, the locking arms 22 extend at a relatively sharp downward and outward incline; the catches 23 sliding down the edges 24 and engaging in holding relation in holding notches 25 cut in said edges at the proper point. Thus, as each drop gate 12 falls to closed position, it is effectively locked against opening from the inside of the cage. To open each gate the corresponding bail 20 is grasped and swung upward, whereupon the gate can be manually moved to open position.

After the trap has been sprung and requires resetting, this is accomplished as follows:

One of the catch fingers 16 forms the lower element of a vertically disposed V-fork, indicated at 26, which includes an upper element 27. Upon the related gate 12 being manually swung upward to a certain extent, after the trap has been sprung, such gate engages in the V-fork 26 whereby, upon continued upward swinging motion of such gate to fully raised position, the longitudinal rod 14 is turned in a direction to raise the catch fingers 16 at both ends of such rod; the gate at the opposite end having first been manually raised.

The parts are then in position for resetting the trip rod 11. With one hand holding the V-fork engaging gate raised, the other hand is used to manipulate a transversely movable rod locating slide 28 mounted in a guide frame 29 on the top of the cage immediately laterally inwardly of the trigger finger 17 and upper portion of the trip rod 11.

The slide 28 includes an upstanding finger tab 30 at its inner end and such slide is normally retracted clear of the trip rod 11.

The slide 28 is formed with a V-notch 31 which opens toward the trip rod 11, and at its inner end such V-notch communicates with a small straight throat 32.

When the slide 28 is advanced or shifted laterally outwardly, the V-notch 31 guides the trip rod 11 into the throat 32, and when located in said throat such rod is directly below the trigger finger 17 for engagement by the latter. With the trip rod 11 so located, the V-fork engaging gate is released; both catch fingers then being maintained in gate supporting relation by reason of the trigger finger 17 resting atop the trip rod 11.

The slide 28 is permitted to remain advanced, while the trip is being transported, positioned for use, and baited. Thereafter, the slide 28 is retracted clear of the trip rod, whence the trap is ready for use in the manner previously described.

The cage 1 is fitted on the top, centrally of its ends and sides, with a fold-down type carrying handle 33 to facilitate transport of the trap from place to place.

The described animal trap is easy to set; sensitive in response to movement of the teeter platform 6 by an animal; and when sprung traps the animal alive and without chance of such animal reopening the gates.

The trap, while very practical and reliable, is of simplified design, embodying a minimum of parts and thus less costly to manufacture.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An animal trap comprising an initially open-ended cage forming a runway therethrough, said runway including a transverse axis, teeter platform intermediate the ends of the cage, drop gates mounted in the ends of the cage, a turnable rod extending along one side of the cage, catch fingers projecting laterally into the cage from the rod in normally supporting relation below the gates, a trigger finger on and projecting laterally from the rod in overhanging relation to the teeter platform, the rod turning to release said catch fingers from the gates upon lowering motion of the trigger finger below a predetermined point, and an upstanding trip rod secured to the teeter platform and normally engaged with the trigger finger from below whereby to quick-releasably support the same at such point.

2. An animal trap, as in claim 1, in which one of said catch fingers is the lower element of a fork having an upper element; the corresponding gate engaging in the fork and swinging it upward upon raising of said gate from closed, dropped position, whereby to turn the rod in a direction to raise the trigger finger for engagement of the trip rod thereunder.

3. An animal trap comprising an initially open-ended cage forming a runway therethrough, said runway including a transverse axis, teeter platform intermediate the ends of the cage, drop gates mounted in the ends of the cage, a turnable rod extending along one side of the cage, catch fingers projecting laterally into the cage from the rod in normally supporting relation below the gates, a trigger finger on and projecting laterally from the rod in overhanging relation to the teeter platform, the rod turning to release said catch fingers from the gates upon lowering motion of the trigger finger below a predetermined point, an upstanding trip rod secured to the teeter platform and normally engaged with the trigger finger from below whereby to quick-releasably support the same at such point, and releasable means operative to secure the trip rod in a non-movable position in engagement with the trigger finger.

4. An animal trap, as in claim 3, in which said last named means comprises a slide mounted atop the cage for guided lateral motion to and from the upper end portion of the trip rod, the latter projecting above the top of the cage, and the slide having a holding notch therein opening toward and adapted to receive said rod therein.

5. An animal trap, as in claim 4, in which said notch is V-shaped to guide the rod, with a narrow throat at the inner end of said notch to receive the rod in locating relation.

HENRY A. REEB.

REFERENCES CITED

The following references are of record in the file of this patent:

UNITED STATES PATENTS

| Number | Name | Date |
|---|---|---|
| 206,836 | Sewall | Aug. 6, 1878 |
| 331,223 | Ayres | Nov. 24, 1885 |
| 1,686,432 | Bleck | Oct. 2, 1928 |
| 1,842,618 | Mack | Jan. 26, 1932 |